United States Patent
Südel et al.

(10) Patent No.: US 12,297,928 B2
(45) Date of Patent: May 13, 2025

(54) DRIVE FOR A VALVE AND METHOD

(71) Applicant: GEA Tuchenhagen GmbH, Büchen (DE)

(72) Inventors: Matthias Südel, Ratekau (DE); Jens Burmester, Grambek (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 18/012,125

(22) PCT Filed: Jun. 28, 2021

(86) PCT No.: PCT/EP2021/067670
§ 371 (c)(1),
(2) Date: Dec. 21, 2022

(87) PCT Pub. No.: WO2022/002840
PCT Pub. Date: Jan. 6, 2022

(65) Prior Publication Data
US 2023/0265940 A1 Aug. 24, 2023

(30) Foreign Application Priority Data
Jul. 2, 2020 (DE) .................... 10 2020 003 979.0

(51) Int. Cl.
*F16K 31/122* (2006.01)
*F16K 1/44* (2006.01)
*F16K 1/52* (2006.01)

(52) U.S. Cl.
CPC .......... *F16K 31/1225* (2013.01); *F16K 1/446* (2013.01); *F16K 1/523* (2013.01)

(58) Field of Classification Search
CPC ....... F16K 31/1225; F16K 1/446; F16K 1/523
See application file for complete search history.

(56) References Cited

U.S. PATENT DOCUMENTS

| | | | |
|---|---|---|---|
| 3,179,003 A * | 4/1965 | Tompson | G04B 19/34 368/79 |
| 6,014,983 A * | 1/2000 | Sondergaard | F16K 1/446 137/240 |

(Continued)

FOREIGN PATENT DOCUMENTS

| | | |
|---|---|---|
| DE | 41 18 874 A1 | 12/1992 |
| DE | 102 53 434 B3 | 7/2004 |

(Continued)

OTHER PUBLICATIONS

WO-2005093299-A1, Burmester, Translation (Year: 2005).*

*Primary Examiner* — Daphne M Barry
(74) *Attorney, Agent, or Firm* — Young Basile Hanlon & MacFarlane, P.C.

(57) ABSTRACT

A drive that is drivable by a pressure medium is described. The drive is used for a valve that can be used in hygienic applications. The drive includes a drive housing, in which a main piston is movable along a stroke direction by the action of the pressure medium and can be coupled to a rod, and a stop for limiting a movement of the main piston. To improve the drive, it is proposed that an additional piston is provided, which is movable by the action of the pressure medium. The stop can be carried along by the additional piston. The disclosure also describes a double-seat valve comprising such a drive and to a method for operating such a drive.

18 Claims, 3 Drawing Sheets

(56) References Cited

U.S. PATENT DOCUMENTS

| | | | | |
|---|---|---|---|---|
| 8,459,294 B2* | 6/2013 | Burmester | .............. | F16K 1/446 |
| | | | | 137/240 |
| 2007/0215830 A1* | 9/2007 | Norton | .................... | F16K 1/446 |
| | | | | 251/205 |
| 2010/0243073 A1* | 9/2010 | Tolle | ....................... | F16K 1/446 |
| | | | | 137/238 |
| 2011/0005611 A1* | 1/2011 | Burmester | .............. | F16K 1/446 |
| | | | | 137/240 |
| 2011/0100492 A1* | 5/2011 | Burmester | .............. | F16K 1/446 |
| | | | | 137/625.69 |
| 2011/0309282 A1* | 12/2011 | Wiedenmann | .......... | F16K 1/446 |
| | | | | 251/324 |
| 2014/0311600 A1* | 10/2014 | Burmester | .............. | F16K 1/446 |
| | | | | 137/613 |
| 2015/0211642 A1* | 7/2015 | Burmester | .............. | F16K 1/446 |
| | | | | 251/332 |
| 2017/0037974 A1* | 2/2017 | Sauer | ...................... | F16K 1/446 |

FOREIGN PATENT DOCUMENTS

| | | | | |
|---|---|---|---|---|
| DE | 20 2006 012 959 U1 | 10/2006 | | |
| DE | 10 2008 032 689 A1 | 1/2010 | | |
| EP | 0 646 741 B1 | 9/1996 | | |
| EP | 2 253 872 A2 | 11/2010 | | |
| EP | 2 253 872 A3 | 11/2013 | | |
| NL | 6 701 438 A | 7/1968 | | |
| WO | WO-2005093299 A1 * | 10/2005 | ............. | F16K 1/446 |
| WO | 2009/115255 A1 | 9/2009 | | |
| WO | 2013/113341 A1 | 8/2013 | | |

* cited by examiner

DRIVE FOR A VALVE AND METHOD

TECHNICAL FIELD

The invention relates to a drive for a valve that can be used in hygienic applications and to a method for operating such a drive.

BACKGROUND

Drives of the generic type are used to actuate valves in facilities for producing food, drinks, medications, and fine chemical products as well as in biotechnology.

These applications require a hygienic design of the valve. This also affects those locations at which rods, with which the closure bodies in the interior of the valve can be displaced, leave the directly product-conducting interior. At such a location, a seal sliding on the rod can be provided. It is practical to design this seal to be cleanable.

In the prior art, such a cleaning of the seal is shown in a double-seat valve.

WO 2009/115255 A1 and EP 0 646 741 B1 show arrangements which allow the seal to be exposed for cleaning in a cleaning step. Both documents show such arrangements, and EP 0 646 741 B1 also shows cleaning of the drive-side seal, which is designed to slide on a closure body portion. An even older document is DE 41 18 874 A1, which also shows cleaning of the drive-side seal.

In EP 0 646 741 B1, the cleaning position for the mentioned seal is coupled to cleaning position of the main seals on the valve seats. The drive operated with a pressure medium is therefore designed to perform a partial stroke, in addition to the full stroke or main stroke. DE 41 18 874 A1 and WO 2009/115255 A1 do not provide additional details about the drives.

SUMMARY

It was therefore an object of the invention to present an improved drive for actuating to a cleaning position and an improved method for operating a drive.

This object is achieved by a drive, a double-seat valve, and a method described herein.

The invention is based on the knowledge that using an actuated main piston to create a cleaning position represents a structurally particularly simple and therefore reliable and cost-effective solution. The main piston serves primarily to displace a closure element when opening and closing a valve. To achieve the movement for the cleaning position and the movement for opening the valve with the main piston, a stop, against which this main piston is moved, is designed to be movable in the direction of the stroke. This allows the main piston to be actuated to bring it into two different positions, depending on the position in which the stop is located. The displacement of the stop can be performed by means of a pressure medium-controlled additional piston, in that the stop can be designed to be carried along by the additional piston. The stop and the additional piston can be configured as one part. The main piston can be coupled to a rod of a valve, which coupling can be designed to be releasable. Screw and clamp connections are conceivable. In addition, the coupling can be designed indirectly in that at least one additional component, for example, a rod portion, is located between the main piston and the rod. The coupling results in an operative connection, which comprises in particular component entrainment and force transmission. The rod can be designed as a hollow rod.

In a first development, it is proposed that the main piston is accommodated in a first auxiliary piston in a manner that is displaceable in relation to the first auxiliary piston, wherein an active surface of the main piston can be subjected to the pressure medium and is surrounded by an annular surface of the first auxiliary piston that can also be subjected to the pressure medium. The displaceability of the main piston and the first auxiliary piston enable the actuation of a closure element in a cleaning stroke. In this case, the drive is preferably designed to be compact.

According to another development, the additional piston is accommodated in a cylinder, which is closed by a coupling, on a side of an end wall that faces away from a spring package. This arrangement is cost-effective because the additional piston is easily accessible both during the installation of the drive and for the supply of pressure medium.

This aforementioned development can be improved further in that the pressure medium can be supplied via a fourth pressure medium connection between the end wall and the additional piston and through a pressure medium channel between the coupling and the additional piston. In this manner, the additional piston is moved in each of its movement directions by the application of pressure medium, and an air/air system is created. By omitting a spring package, which effects a movement in one of the directions, the drive is designed to be compact.

According to another development, it is proposed that surfaces of the main piston and additional piston that are loaded with pressure medium are designed to be approximately the same size. "Approximately" here means deviating from geometrically equal surfaces and still achieving the goal. This goal consists of being able to take pressure medium from a common pressure medium source without adaptation measures and effect cleaning positions and the main stroke, meaning the open position of the valve. This development simplifies the provision and guidance of the pressure medium. Therefore, the next development also proposes, starting from the dimensioning of the main piston and the additional piston just described, using only one pressure medium source to effect the cleaning position and open position of the valve.

Starting from an arrangement in which a pressure medium can be applied to the additional piston from both sides, it is proposed in another development to position the additional piston in a floating manner. For this purpose, a pressure medium is applied simultaneously through the fourth pressure medium connection and the pressure medium channel. A floating, meaning force-neutral, positioning has the advantage that the additional piston and thus the stop can be carried along by the main piston as passive components. This makes the wiring for generating a cleaning position easier, because an additional means for displacing the stop can be omitted.

The advantages of the previously described drive and its developments are particularly apparent in combination with a double-seat valve in which the seats can be cleaned. Due to the multiple closure bodies and the necessity of cleaning positions for these closure bodies, the compact design is particularly useful for achieving the necessary functions. Compared to known drives, an additional cleaning position of the valve is enabled in a simple manner by the drive presented here.

Regardless of the design of the drive described here, a method for operating drive, which is operable with a pressure medium, for a valve, in particular a double-seat valve, that can be used in hygienic applications is advantageous, in which method a stop that limits movement of a main piston is displaced by application of a pressure medium. As a result, the drive can also be operated completely with a pressure medium, even the displaceability of the stop. The displaceability enables closure bodies to be actuated into at least one cleaning position in a cost-effective and structurally simple manner.

This method is improved in that the stop is coupled to an additional piston and a pressure medium is supplied via a fourth pressure medium connection between an end wall and the additional piston and a pressure medium is supplied through a pressure medium channel between a coupling and the additional piston. By actuating the additional piston into its two movement directions with a pressure medium, the actuation is considerably simplified. In addition, the additional piston is active in both directions and not passive, as, for example, when a spring is used.

BRIEF DESCRIPTION OF THE DRAWINGS

The invention will be explained in more detail on the basis of an example embodiment and its developments. The depiction of the advantages will also be expanded upon. The following is shown in the figures.

DETAILED DESCRIPTION

Figure 1:
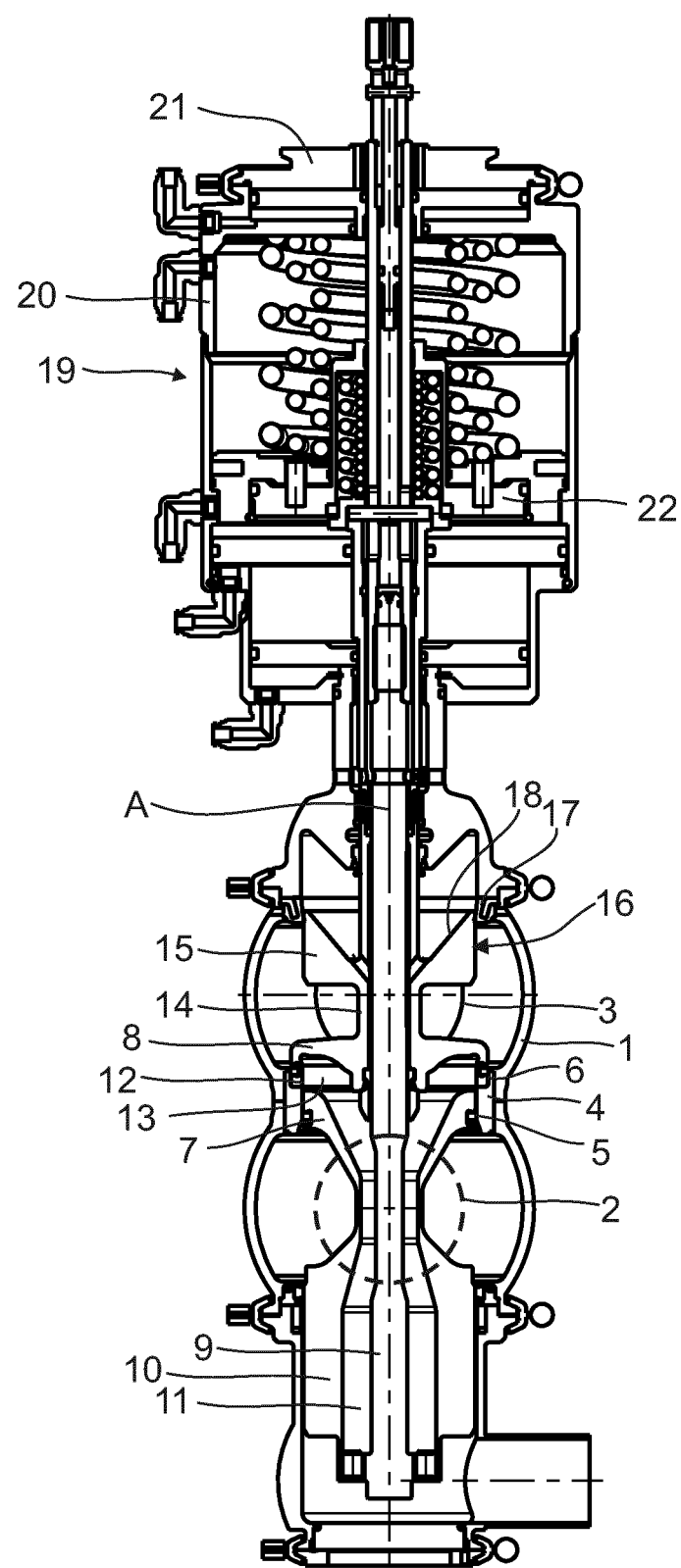
FIG. 1 is a double-seat valve in the resting position.

The valve according to the example is designed as a double-seat valve. It is shown in FIG. 1 resting position, which in this example is the closed position of the valve. The valve has a housing 1, which is provided with a first connection 2 and a second connection 3. In the housing 1, a passage 4 is provided between the connections 2 and 3. At least one valve seat is formed on the passage 4; preferably, a first valve seat 5 and a second valve seat 6 are provided.

The valve comprises a first closure body 7 and a second closure body 8. The first closure body 7 is associated with the first valve seat 5 and the second closure body 8 is associated with the second valve seat 6. A sealing contact can be established between the closure bodies 7 and 8 and each of the valve seats 5 and 6. This contact can occur by metallic linear contact or be supported by a seal. For the aforementioned area of application of the valve, elastomers are known, for example, from the group of ethylene propylene diene monomers (EPDM). The first closure body 7 comprises a rod 9, which is surrounded by and connected to a primarily rotationally symmetrical hollow body 10. A drainage channel 11 is located between the rod 9 and the hollow body 10. The drainage channel 11 is opened on a side of the first closure body 7 that faces the second closure body 8 and on a side of the first closure body 7 that faces away from the second closure body 8. The side facing the second closure body 8 is designed to be closable by means of the second closure body 8. The first closure body 7 can have an approximately dumbbell-shaped cross-section and be designed to be equally pressurized. Equally pressurized means that fluid under pressure in the valve exerts on the closure body 7 an approximately equal amount of force on the closure body 7 in both directions of a longitudinal axis A.

The second closure body 8 has a socket 12 on its side facing the first closure body 7. The first closure body 7 can be accommodated in this socket 12 in a sealing manner, for example, in the open position of the valve shown in FIG. 2.

The first closure body 7 and the second closure body 8 delimit what is known as a leakage space 13, from which fluid can be discharged by means of the drainage channel 11. This fluid can be a cleaning fluid, which can enter the leakage space 13 as soon as the closure bodies 7 and 8 are removed from each other. This is the case in what is known as the lifting stroke of the cleaning position. Cleaning fluid cleans inner surfaces of the valve and the valve seats 5 and 6, flows into the leakage space 13, and is discharged through the drainage channel 11. If the sealing contact between a closure body 7 and 8 and the assigned valve seat 5 and 6 fails, for example, due to wear, the resulting leakage is also discharged through the leakage space 13.

The second closure body 8 comprises a hollow rod 14, which accommodates the rod 9. On the hollow rod, an extension portion 15 is attached or formed, which is also passed through by the rod 9.

The extension portion 15 has a cylinder surface 16, with which a seal 17 can be brought into sliding engagement. In particular in the closed position and the open position of the valve, a sealing contact between the seal 17 and the cylinder surface 16 is formed.

A funnel 18 adjoins the cylinder surface 16 and is in a fluid-conducting connection with a gap between the rod 9 and the hollow rod 14. In the longitudinal section, the funnel 18 means a line that is angled toward the longitudinal axis and the radially inner part of which is closer to the leakage space 13 than a radially outer part. In particular, the design of the funnel 18 as well as the rod 9 and hollow rod 14 effects a diversion of liquid into the leakage space 13. This can be liquid that passes through between the seal 17 and the extension portion 15, for example, during cleaning or if the seal 17 fails.

In an advantageous embodiment, the extension portion 15 is dimensioned so that the second closure body 8 is equally pressurized.

In principle, it is known to subject the critical parts of the valve such as the closure bodies 7 and 8 and valve seats 5 and 6 to cleaning. The necessary measures are implemented on the valve shown or can be added. A known solution that is used for this is proposed in WO 2013/113341 A1.

In the following, the seal 17 and its cleaning are subjected to more precise consideration.

Figure 2:
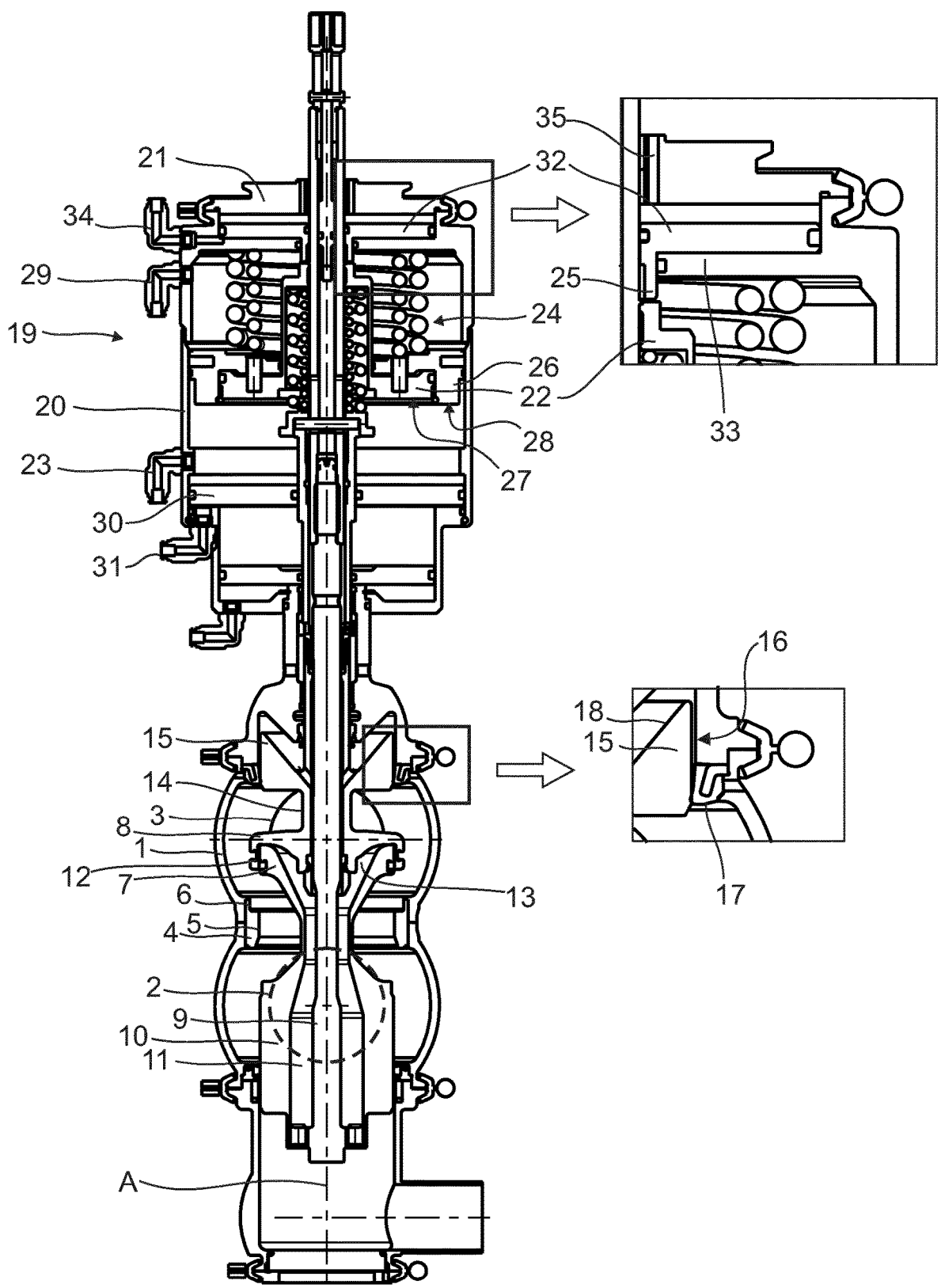
FIG. 2 is the double-seat valve according to the example with the closure body in the main stroke position.
Figure 3:
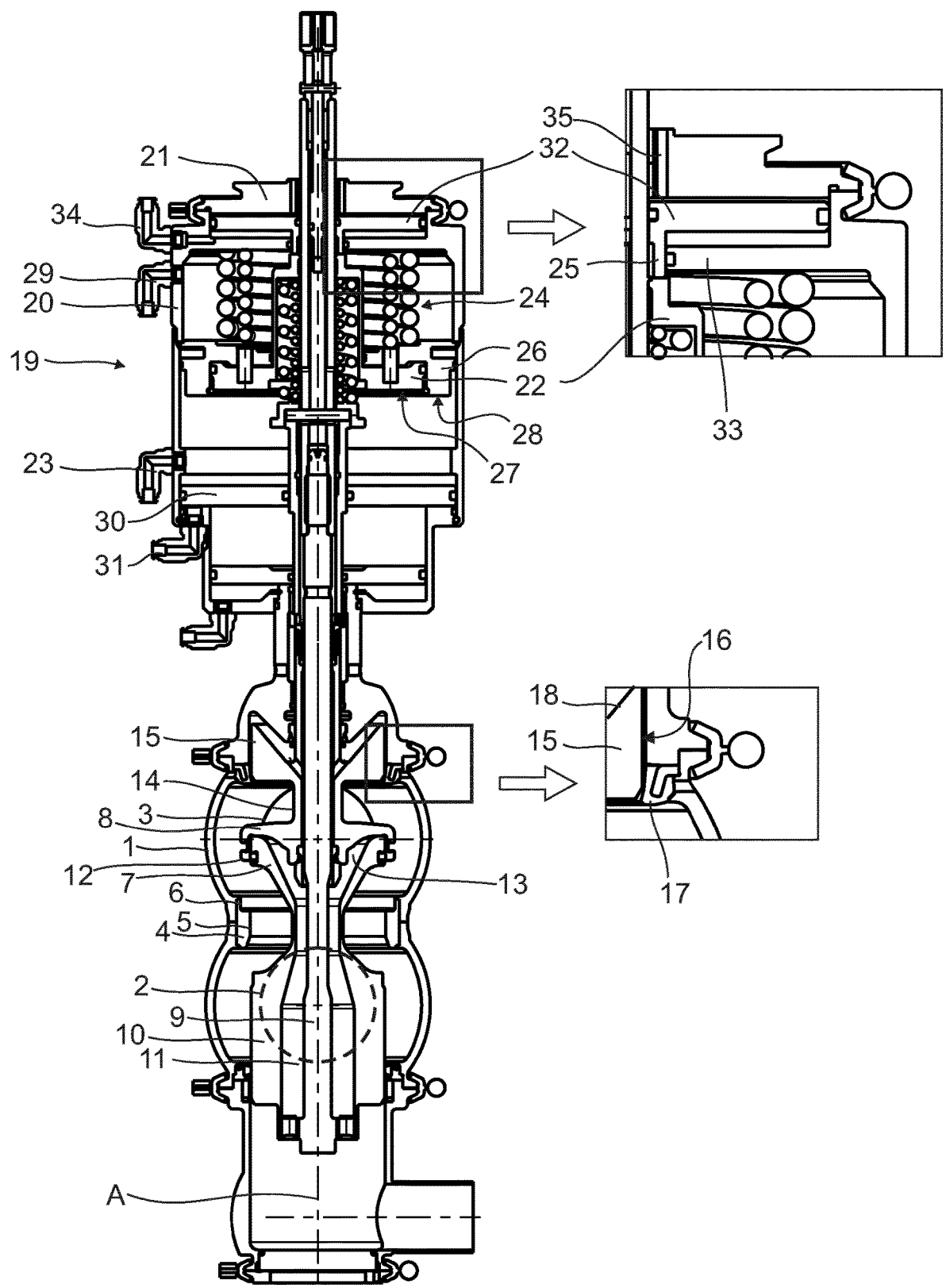
FIG. 3 is the double-seat valve according to the example in a cleaning position as a result of a changed main stroke.

FIG. 2 shows the valve in its main stroke position, in which it is open and the fluid connection between the connections 2 and 3 exists. FIG. 3 shows a cleaning position, in which the seal 17 is exposed and can be washed with cleaning fluid. For better illustration, FIG. 2 and FIG. 3 each show two cut-outs in an enlarged view. These show the region of the seal 17 and a part of a drive 19.

The drive 19 has a single-part or multi-part drive housing 20, which is mechanically connected to the housing 1 of the valve. On a side facing away from the housing 1, the drive 19 has a coupling 21. With this coupling 21, the drive 19 can be connected to a control head (not shown). The control head can comprise an electronic actuator and a pressure medium control.

In the drive housing 20, at least one piston is present, which interacts with an associated running surface.

In the example shown here, the drive 19 comprises a main piston 22. This is operatively connected to the rod 9. This connection is configured to transmit force and can be designed to be releasable. For example, it can be a screw or plug connection. A releasable coupling or respectively connection of the main piston 22 and rod 9 allows the drive to be released from the valve housing and to be operated as its own structural unit. A pressure medium supplied through a first pressure medium connection 23 moves the main piston 22 against the force of a spring package 24 provided with at least one spring. This movement is limited mechanically by a stop 25. The pressure medium-induced movement of the main piston 22 is transmitted to the rod 9 and thus to the first closure body 7, which is brought out of the resting position shown in FIG. 1 and into an open position in accordance with FIG. 2. In this case, the first closure body 7 comes into contact with the second closure body 8, whereby the second closure body 8 is also moved into the open position by entrainment. The leakage space 13 is thereby separated from the product-conducting parts of the valve.

The main piston 22 can be accommodated in a first auxiliary piston 26. In this case, an active surface 27 of the main piston 22 can be exposed to pressure medium and is surrounded by an annular surface 28 of the first auxiliary piston 26, which can also be exposed to the pressure medium. The main piston 22 and the first auxiliary piston 26 are designed to be displaceable in relation to each other. They can be designed such that the displacement (e.g., in a stroke direction) can be effected in a pressure medium-induced manner (i.e., by action or application of the pressure medium). The displacement allows the first closure body 7 to be brought into a cleaning position in accordance with WO 2013/113341 A1. A second pressure medium connection 29 allows the supply of the pressure medium. Channels and gaps conduct it into the region between the main piston 22 and the first auxiliary piston 26.

A second auxiliary piston 30 is operatively connected to the hollow rod 14 and can be displaced by means of a pressure medium that can be supplied through a third pressure medium connection 31. Supplying the pressure medium brings the second closure body 8 into a cleaning position in accordance with WO 2013/113341 A1.

The drive 19 comprises an additional piston 32 and an end wall 33. The spring package 24 is supported on the end wall. On a side of the end wall 33 facing away from the spring package 24, a cylinder for accommodating the additional piston 32 is formed, which is closed by the coupling 21. Between the end wall 33 and the additional piston 32, a pressure medium can be supplied via a fourth pressure medium connection 34, as a result of which the additional piston is pressed in the direction of the coupling 21. The structural design shown here is advantageous, because the pressure medium can be supplied from the control head through a pressure medium channel 35 between the coupling 21 and the additional piston 32 to generate a force, which is directed away from the coupling 21, on the additional piston 32. This creates a piston that can be controlled in two directions by a pressure medium, known as an air/air drive. This has a compact design because installation space for a spring package is saved.

The stop 25, which limits the path of the main piston 22 through direct or indirect contact, is coupled to the additional piston 32. This can be a common guide if the additional piston 32 and the stop 25 are designed as separate components. The stop 25 and additional piston 32 can advantageously be designed as a single piece, which increases operational reliability, simplifies installation, and reduces production costs.

The maximum path that the main piston 22 can travel in its stroke depends on the position of the additional piston 32. If the additional piston 32 is in contact with the end wall 33, the path is shorter than in the second position of the additional piston 32, in which it is in contact with the coupling 21. By supplying a pressure medium selectively through the fourth pressure medium connection 34 or the pressure medium channel 35, the stop 25 can be brought into one of the mentioned positions.

FIG. 2 shows that the additional piston 32 is in contact with the end wall 33. The stroke of the main piston 22, which is limited by this, leads to a position of the closure bodies 7 and 8 in which the seal 17 is in sealing contact with the cylinder surface 16 of the extension portion 15 on the second closure body 8.

In FIG. 3, the additional piston 32 is in its position in which it faces the coupling 21 and touches it or only a small gap exists between the coupling 21 and the additional piston 32. Accordingly, the stroke of the main piston 22 is now larger. As shown in the lower detailed view in FIG. 3, this leads to a position of the extension portion 15 in which a gap is formed between the extension portion 15 and the seal 17. This gap allows the seal 17 to be reliably cleaned by letting cleaning medium into the valve. The cleaning medium flows through the gap between the seal 17 and the extension portion 15 along the cylinder surface 16 into the funnel 18 and from there into the drainage channel 11. This ensures reliable and, compared to the prior art, considerably improved cleanliness of the seal 17 and thus improved cleanability of the valve. This is particularly important for the areas of application mentioned above.

It is advantageous to design the pressure medium-loaded surfaces of the main piston 22 and the additional piston 32 to be approximately the same size. In this case, the same pressure medium source can be used for the cleaning position, the pressure medium of which is let in through the first pressure medium connection 23 and the fourth pressure medium connection 34 to generate the cleaning position in accordance with FIG. 3. In this embodiment, pressure medium from the same pressure medium source can also be used to apply pressure medium to the first pressure medium connection 23 and the pressure medium channel 35 and thus to effect the open position of the valve.

In an advantageous embodiment, a pressure medium is applied to the additional piston 32 simultaneously through the fourth pressure medium connection 34 and the pressure medium channel 35. As a result, there is no resulting force from this pressure medium application, and the additional piston 32 is positioned in a floating manner. The additional piston 32 with the stop 25 can then be brought into the cleaning position according to FIG. 3 by applying pressure medium to the main piston 22. The main piston 22 is moved against the stop 25 by the pressure medium, and the contact between the main piston 22 and the stop 25 transmits the movement of the main piston 22 to the additional piston 32, which is shifted toward the coupling 21 as a result.

The invention is advantageous for the double-seat valve shown, but the invention is not limited thereto. In principle, it is advantageous for stroke valves of the mentioned area of application when a seal such as seal 17, which seals a valve rod against the housing, can be exposed for cleaning. The particular advantage in the case of double-seat or double-chamber valves is the possibility of being able to remove the cleaning medium from the valve through a separate outlet. This can be an advantageously valve-controlled side outlet arranged directly in the wall of the passage 4 between the valve seats 5 and 6, instead of the drainage channel 11. Such an arrangement is provided, for example, in the double-chamber valves.

A list of reference numbers used in this specification and the drawing figures is below.
1 Housing
2 First connection
3 Second connection
4 Passage
5 First valve seat
6 Second valve seat
7 First closure body
8 Second closure body
9 Rod
10 Hollow body
11 Drainage channel
12 Socket
13 Leakage space
14 Hollow rod
15 Extension portion
16 Cylinder surface
17 Seal
18 Funnel
19 Drive
20 Drive housing
21 Coupling
22 Main piston
23 First pressure medium connection
24 Spring package
25 Stop
26 First auxiliary piston
27 Active surface
28 Annular surface
29 Second pressure medium connection
30 Second auxiliary piston
31 Third pressure medium connection
32 Additional piston
33 End wall
34 Fourth pressure medium connection
35 Pressure medium channel
A Longitudinal axis

The invention claimed is:

1. A drive, which is operable with a pressure medium, for a valve that can be used in hygienic applications, the drive comprising:
a drive housing, in which a main piston is movable along a stroke direction by action of the pressure medium and is coupled to a rod;
a stop for limiting a movement of the main piston; and
an additional piston, which is movable by the action of the pressure medium, wherein the stop is carried along by the additional piston, and wherein, depending on a position in which the stop is located, the main piston is movable between a position for opening the valve and a cleaning position of the valve.

2. The drive according to claim 1, wherein the additional piston is accommodated in a cylinder on a side of an end wall facing away from a spring package, which cylinder is closed by a coupling.

3. The drive according to claim 2, wherein the pressure medium is supplied via a fourth pressure medium connection between the end wall and the additional piston and is supplied through a pressure medium channel between the coupling and the additional piston.

4. The drive according to claim 3, wherein the additional piston is positioned in a floating manner by application of the pressure medium through the fourth pressure medium connection and the pressure medium channel.

5. The drive according to claim 2, wherein pressure medium-loaded surfaces of the main piston and the additional piston are designed to be approximately a same size.

6. The drive according to claim 5, wherein a same pressure medium source is used to effect the cleaning position and the position for opening the valve.

7. The drive according to claim 1, wherein pressure medium-loaded surfaces of the main piston and the additional piston are designed to be approximately a same size.

8. The drive according to claim 7, wherein a same pressure medium source is used to the cleaning position and the position for opening the valve.

9. A double-seat valve in which seats thereof can be cleaned, comprising:
a seal, which is exposed for cleaning and which seals a hollow rod against a housing, wherein the double-seat valve is coupled to the drive according to claim 1.

10. The drive according to claim 1, wherein the additional piston is accommodated in a cylinder on a side of an end wall facing away from a spring package, which cylinder is closed by a coupling, wherein the pressure medium is supplied via a fourth pressure medium connection between the end wall and the additional piston and is supplied through a pressure medium channel between the coupling and the additional piston, wherein pressure medium-loaded surfaces of the main piston and the additional piston are designed to be approximately a same size, and wherein the additional piston is positioned in a floating manner by application of the pressure medium through the fourth pressure medium connection and the pressure medium channel.

11. The drive according to claim 1, wherein the additional piston is accommodated in a cylinder on a side of an end wall facing away from a spring package, which cylinder is closed by a coupling, wherein the pressure medium is supplied via a fourth pressure medium connection between the end wall and the additional piston and is supplied through a pressure medium channel between the coupling and the additional piston, wherein a same pressure medium source is used to effect the cleaning position and the position for opening the valve, and wherein the additional piston is positioned in a floating manner by application of pressure medium through the fourth pressure medium connection and the pressure medium channel.

12. A method for operating a drive, which is operable with a pressure medium, for a valve that can be used in hygienic applications, wherein a stop that limits movement of a main piston is displaced by application of the pressure medium, and, depending on a position in which the stop is located, the main piston is movable between a position for opening the valve and a cleaning position of the valve.

13. The method according to claim 12, wherein the stop is coupled to an additional piston and the pressure medium is supplied via a fourth pressure medium connection between an end wall and the additional piston and the pressure medium is supplied through a pressure medium channel between a coupling and the additional piston.

14. A drive, which is operable with a pressure medium, for a valve that can be used in hygienic applications, the drive comprising:
a drive housing, in which a main piston is movable along a stroke direction by action of the pressure medium and is coupled to a rod;
a stop for limiting a movement of the main piston; and
an additional piston, which is movable by the action of the pressure medium, wherein the stop is carried along by the additional piston, wherein, depending on a position in which the stop is located, the main piston is movable between a position for opening the valve and a cleaning position of the valve, and wherein the main piston is accommodated in a first auxiliary piston so that it is displaceable in relation to the first auxiliary piston, and an active surface of the main piston is subjected to the pressure medium and is surrounded by an annular surface of the first auxiliary piston, which is also subjected to the pressure medium.

15. The drive according to claim 14, wherein the additional piston is accommodated in a cylinder on a side of an end wall facing away from a spring package, which cylinder is closed by a coupling.

16. The drive according to claim 15, wherein the pressure medium is supplied via a fourth pressure medium connection between the end wall and the additional piston and is supplied through a pressure medium channel between the coupling and the additional piston.

17. The drive according to claim 14, wherein pressure medium-loaded surfaces of the main piston and the additional piston are designed to be approximately a same size.

18. The drive according to claim 17, wherein a same pressure medium source is used to effect the cleaning position and the position for opening the valve.

* * * * *